United States Patent
Starzmann

(10) Patent No.: US 9,586,236 B2
(45) Date of Patent: Mar. 7, 2017

(54) SORTING DEVICE

(71) Applicant: FESTO AG & Co. KG, Esslingen (DE)

(72) Inventor: Ralf Starzmann, Reichenbach (DE)

(73) Assignee: FESTO AG & CO. KG, Esslingen (DE)

( * ) Notice: Subject to any disclaimer, the term of this patent is extended or adjusted under 35 U.S.C. 154(b) by 0 days.

(21) Appl. No.: 14/657,238

(22) Filed: Mar. 13, 2015

(65) Prior Publication Data

US 2015/0266062 A1    Sep. 24, 2015

(30) Foreign Application Priority Data

Mar. 24, 2014  (EP) .................................... 14400022

(51) Int. Cl.
| | | |
|---|---|---|
| *B07C 5/00* | (2006.01) | |
| *B07C 5/36* | (2006.01) | |
| *F16K 21/00* | (2006.01) | |
| *F16K 21/04* | (2006.01) | |

(52) U.S. Cl.
CPC ............... *B07C 5/368* (2013.01); *B07C 5/36* (2013.01); *F16K 21/00* (2013.01); *F16K 21/04* (2013.01)

(58) Field of Classification Search
CPC  B07C 5/36; B07C 5/363; B07C 5/365; B07C 5/366; B07C 5/368; F16K 3/00; F16K 3/02; F16K 3/0209; F16K 3/26; F16K 21/00; F16K 21/04

USPC ............ 209/44.2, 638, 639, 644; 251/129.01
See application file for complete search history.

(56) References Cited

U.S. PATENT DOCUMENTS

| | | | | |
|---|---|---|---|---|
| 4,399,916 A | * | 8/1983 | Richter | ............... G01M 3/3236 209/523 |
| 2006/0226056 A1 | * | 10/2006 | Oestreich | ................ B07C 5/368 209/720 |
| 2007/0056887 A1 | * | 3/2007 | Neuhold | ................. B07C 5/368 209/646 |
| 2012/0112107 A1 | * | 5/2012 | Da Pont | .................. F16K 11/24 251/129.15 |

FOREIGN PATENT DOCUMENTS

| | | |
|---|---|---|
| DE | 102009006654 | 10/2010 |
| EP | 0426893 | 5/1991 |
| WO | WO 2010/140096 | 12/2010 |

* cited by examiner

*Primary Examiner* — Joseph C Rodriguez
*Assistant Examiner* — Kalyanavenkateshware Kumar
(74) *Attorney, Agent, or Firm* — Hoffmann & Baron, LLP

(57) ABSTRACT

A sorting device which is suitable for sorting parts by means of air blasts and which includes at least one sorting unit which includes a valve support fitted with sorting valves. Each sorting valve is capable of optionally connecting a sorting passage ending in a sorting nozzle to a feed passage and of disconnecting it therefrom. In addition, several or all of the sorting passages of the sorting unit are—independently of the sorting valves—connected to a common purge air passage, so that purge air can flow through them without any involvement of the sorting valves, with the result that no impurities enter the sorting passages.

17 Claims, 5 Drawing Sheets

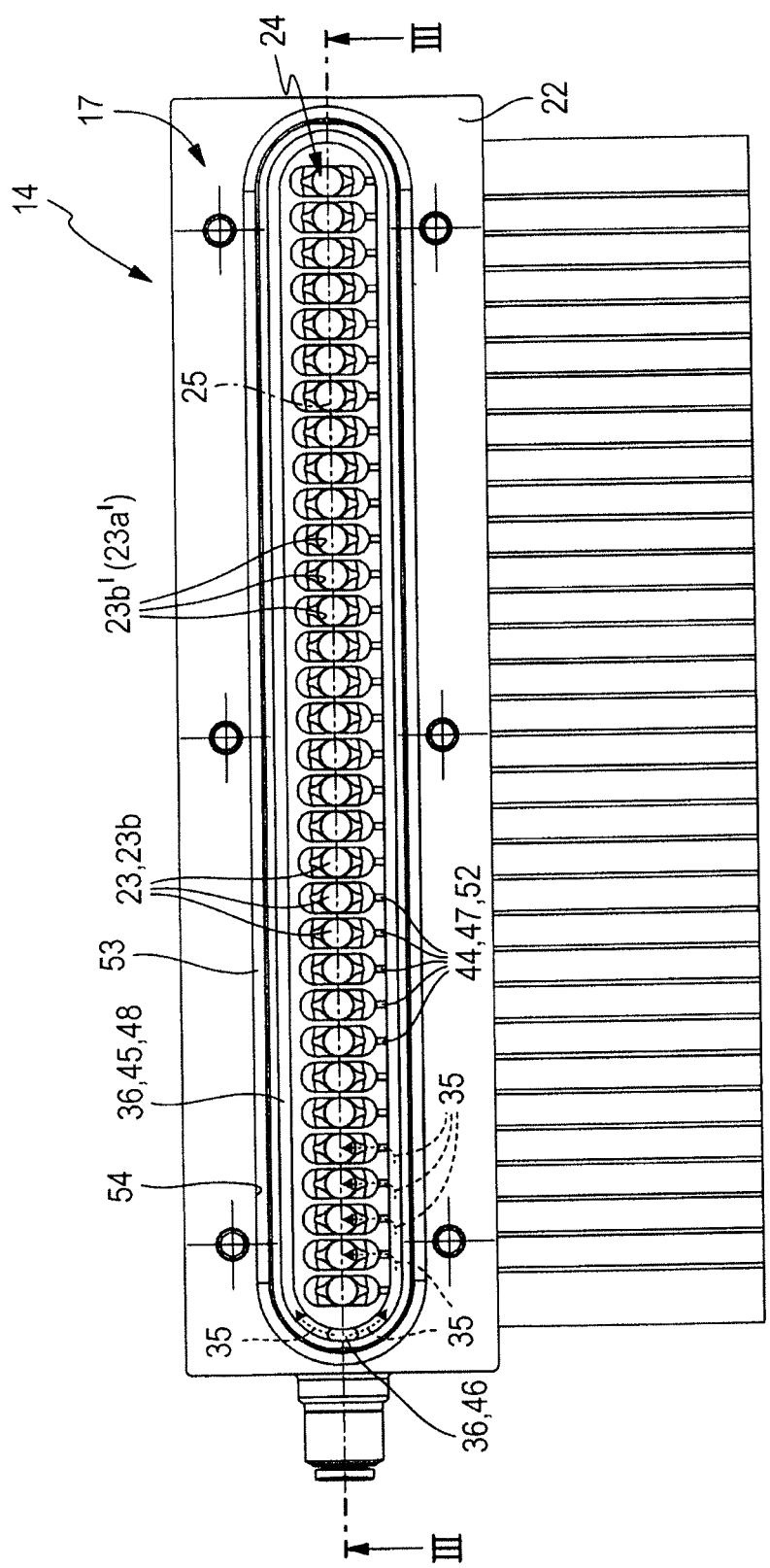

SORTING DEVICE

BACKGROUND OF THE INVENTION

The invention relates to a sorting device for sorting out parts by means of air blasts, the sorting device comprising at least one sorting unit provided with a valve support supporting a plurality of electrically actuated sorting valves which have a 2/2-way functionality, which are supplied with compressed air from a common feed passage and each of which is connected to an individual sorting passage leading to a sorting nozzle, wherein each sorting valve can optionally be switched into an open position connecting the associated sorting passage to the feed passage, thereby causing an air blast to emerge from the associated sorting nozzle, or into a closed position, wherein purging air discharged from the sorting nozzle at a lower flow rate than that of the air blast which can be generated in the open position can be fed into each sorting passage from a purge air passage of the sorting device at least in the closed position of the associated sorting valve for cleaning purposes.

A sorting device of this type, which is known from DE 10 2009 006 654 B3, is used in sorting systems for extracting in a controlled manner out of a flow of individual items individual parts, taking account of certain aspects, by the application of compressed air by means of an air blast. Applications are varied, ranging from the food industry via mining to recycling applications in waste reclamation. EP 0 426 893 A1 describes a possible method for using a sorting device, in which the transparency of the parts to be sorted is used as a sorting criterion.

According to DE 10 2009 006 654 B3, the individual air blasts are generated by means of 2/2-way valves, which can be described as sorting valves, are mounted in large numbers on a valve support and installed into the connection between a common feed passage and individual sorting passages, each of the sorting passages leading to a sorting nozzle from which the air blast is discharged as the need arises. In order to avoid a contamination of the sorting valves and/or the sorting passages even at times of prolonged inactivity of individual sorting valves, each sorting valve of the known sorting device is capable of introducing a purge air flow into the associated sorting passage. The purge air flow results from the arrangement that the sorting valves do not disconnect the common feed passage entirely from the associated sorting passage in the closed position, but let a small amount of compressed air to flow through, which then flows through the adjoining sorting passage to act as purge air. As this functionality requires a relatively complex structure of the sorting valves, the known sorting device is likely to be relatively expensive to produce. Moreover, the flow rate of the purge air can only be adjusted individually for each sorting valve, which affects handling in cases in which, owing to varying sorting applications, varying purge air flow rates are appropriate.

In addition, the applicant is aware internally of unpublished sorting devices in which 3/2-way valves are used as sorting valves; in these, a valve port is connected to a purge air passage providing purge air, so that they let purge air flow through the sorting passage whenever the sorting passage is disconnected from the feed passage providing the compressed air for the air blast. The use of 3/2-way valves involves relatively high costs, especially when the fact that sorting devices usually have to be provided with a very high number of sorting valves is taken into account.

SUMMARY OF THE INVENTION

The invention is based on the problem of creating a sorting device which facilitates an effective air purge of the sorting passages while having an inexpensive structure.

To solve this problem, it is provided, in combination with the features referred to above, that several or all of the sorting passages of the sorting unit are connected to a common purge air passage independently of the sorting valves.

In this way, purge air can be applied to the sorting passages of the sorting device without involving the sorting valves, bypassing them in a manner of speaking, in order to avoid deposits and impurities in the sorting passages. As the purging process of the sorting passages is independent of the sorting valves, inexpensive 2/2-way valves which do not require any special adaptation in terms of purge air control can be used as sorting valves. 2/2-way valves which completely block the connection between the feed passage and the associated sorting passage can be used, because the purge air is effectively fed to the respective sorting passage while bypassing the sorting valve. This moreover offers the advantageous possibility of a uniform adjustment of the purge air flow rate through the sorting passages by varying the purge air quantity fed in via the common purge passage, so that the air consumption can be reduced within a short time if the contamination risk for the sorting passages is relatively low due to current environmental conditions. If nothing else, the structure according to the invention allows for an uninterrupted purge air feed to the sorting passages irrespective of the switching state of the sorting valves, so that an air blast is only superimposed on the steady purge air flow as the need arises. This ensures that air is continuously discharged from each sorting nozzle during the operation of the sorting unit and varies in its flow rate only in dependence of whether an air blast is currently generated, and this air never allows any impurities to enter the system through the sorting nozzles.

Advantageous further developments of the invention can be derived from the dependent claims.

The sorting device is preferably designed such that the common purge air passage terminates in the sorting unit into each individual sorting passage at a point which is distant both from the associated sorting nozzle and from the associated sorting valve. The applicable purge air flow only passes through a subsection adjoining the sorting nozzle of the sorting passage, which is, however, quite sufficient for preventing the ingress of impurities through the sorting nozzles.

The common purge air passage expediently is a passage of the sorting unit which is separate from the common feed passage providing the compressed air for the air blasts. In this way, the pressure conditions prevailing in the purge air passage can be adjusted very variably and independently of the fluid pressure in the feed passage. It is advantageous if the common feed passage terminates on the outside of the sorting unit with a purge air feed-in port to which a purge air source providing the purge air can be connected.

In principle, the purge air source can be the same compressed air source as the one which supplies compressed air to the common feed passage. Irrespective of the type of compressed air source used, it is advantageous if the common purge air passage is provided with a purge air presetting device by means of which the purge air flow rate can be adjusted variably, taking account of current environmental conditions in particular. In particular, a pressure control valve forming a part of the sorting device is used as a purge air presetting device. The purge air presetting device can very easily be connected to a purge air feed-in port available on the outside of the sorting unit.

It is deemed to be particularly expedient if the common purge air passage is connected to each sorting passage with the interposition of at least one individual restrictor passage. In this way, it can be ensured that the same purge air flow rate is applied to all sorting passages connected to the common purge air passage and that the purge air flow is not more intensive in one or other sorting passage than in the rest of the sorting passages. The individual restrictor passages can be implemented in a particularly cost-effective way by providing in one of two adjoining bodies of the sorting unit grooves of a small cross-section which are covered by the other body. This removes the need for complex passage bores for the implementation of the restrictor passages.

In a construction of the sorting device which is deemed to be particularly advantageous, the at least one sorting unit comprises a nozzle body which is fitted to the valve support in a joint region, in which all sorting nozzles are formed and which is expediently constructed as a single piece. Each sorting passage is made up from two longitudinal subsections adjoining one another in the longitudinal direction, these being a longitudinal inner subsection formed in the valve support and a longitudinal outer subsection formed in the nozzle body. The longitudinal inner subsection extends between the joint region and the associated sorting valve, while the longitudinal outer subsection extends between the joint region and the associated sorting nozzle. The sorting passages are preferably connected to the common purge air passage in the joint region between the valve support and the nozzle body.

In this context, it is deemed to be particularly expedient if the common purge air passage is formed in the nozzle body. In this respect, the design of the valve support can concentrate on valve technology and the measures for generating the air blasts.

In the joint region, the valve support preferably has a valve support joint surface to which the nozzle body is attached by a nozzle body joint surface formed thereon. The passage orifices of the longitudinal inner and outer subsections, which merge into one another, are arranged opposite one another in the joint region. The arrangement is designed such that it results in at least one row of orifices, preferably of a linear dimension, which is composed of pairs of oppositely arranged passage orifices.

In the joint region between the valve support and the nozzle body, a purge air distribution passage of the common purge air passage, which communicates with all sorting passages assigned to the row of orifices, is expediently arranged. This purge air distribution passage is expediently represented by a distribution groove which is formed in the nozzle body joint surface and covered by the valve support joint surface, which is preferably grooveless in the region opposite the distribution groove. Although a reverse arrangement or an arrangement with partial cross-sections of the distribution groove formed both in the nozzle body and in the valve support is possible, such an arrangement is considered less expedient, because it would require a suitable profiling of the valve support joint surface.

The purge air distribution passage preferably has a self-contained longitudinal dimension, framing the associated row of orifices in the joint region. In this case, the purge air distribution passage is an annular passage, the distribution groove being an annular groove extending in the joint region.

As mentioned above, a purge air feed-in port communicating with the common purge air passage is expediently provided on the outside of the sorting unit. This a purge air feed-in port is expediently located on the nozzle body, communicating with the purge air distribution passage and in particular with the distribution groove contributing to its formation via a connecting passage formed in the nozzle body.

It is further advantageous if the purge air distribution passage, which is preferably designed as an annular passage, is fluidically parallel-connected to each sorting passage in the joint region with the interposition of at least one individual restrictor passage each, in order to ensure a uniform application of purge air to the various sorting passages. The individual restrictor passages are expediently represented by restrictor grooves formed in the nozzle body joint surface and covered by the valve support joint surface. In this way, the restrictor passages can be produced much more easily than if implemented in the form of passage bores. Alternatively, the restrictor grooves can be at least partially formed in the valve support joint surface.

The sorting valves are preferably arranged in at least one valve bank on the valve support. A particularly compact construction can be achieved if two parallel banks of sorting valves are arranged on the valve support and connected to the sorting nozzles, which are arranged in a single row, by means of associated sorting passages. In this arrangement, consecutive sorting nozzles are expediently connected alternately to sorting valves of one valve bank and the other valve bank. In this context, it is advantageous if the sorting valves of one valve bank are arranged relative to the sorting valves of the other valve bank with an offset corresponding to half the valve width, the centre-to-centre distance between adjacent sorting passages preferably corresponding to half the valve width.

BRIEF DESCRIPTION OF THE DRAWINGS

The invention is explained in greater detail below with reference to the appended drawing, of which:

FIG. 5 is a top view of the nozzle body in the direction of view indicated by arrow V from FIG. 4.

DETAILED DESCRIPTION

Figure 1:
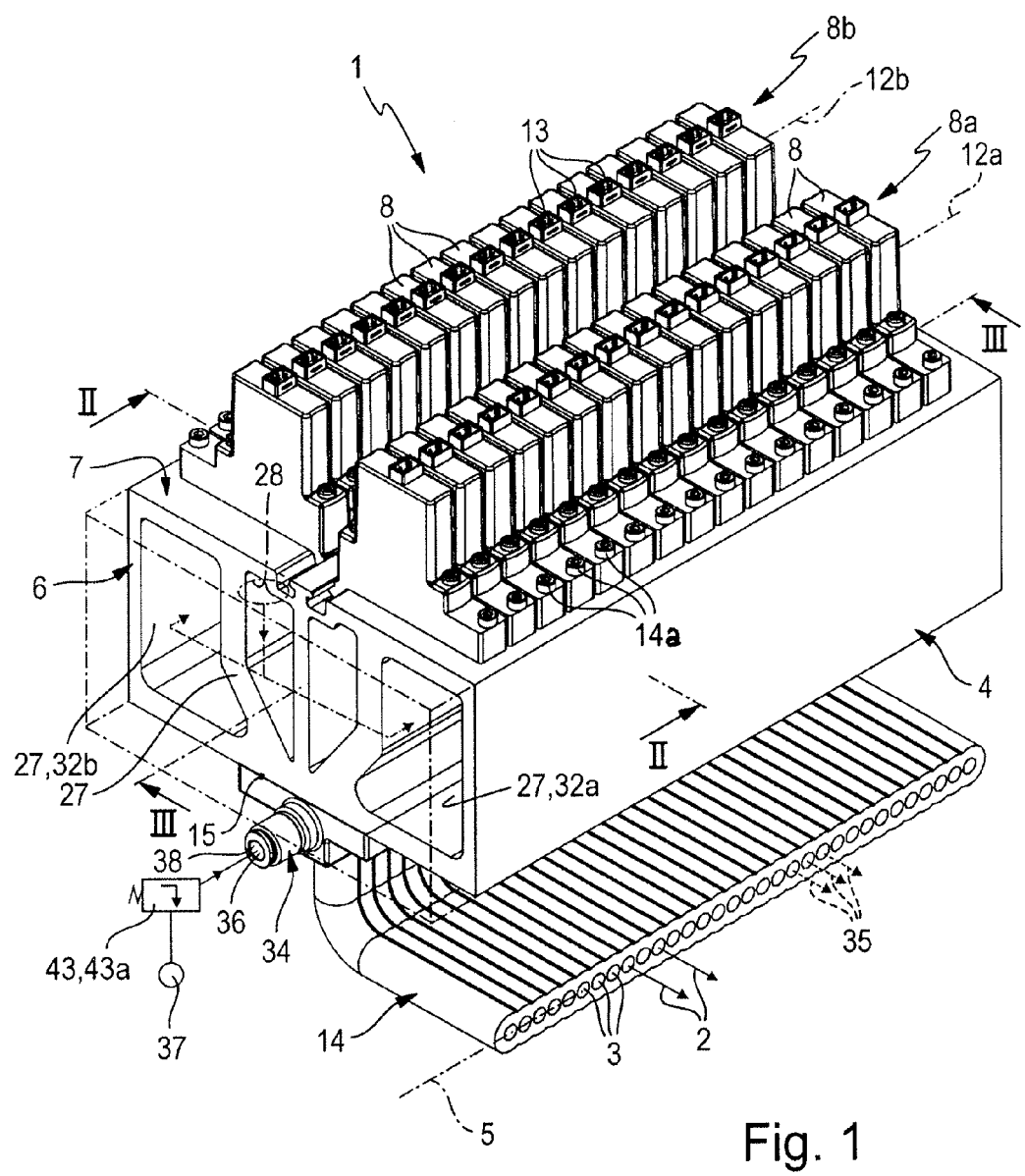
FIG. 1 is a perspective view of a preferred construction of a sorting device according to the invention.
Figure 2:
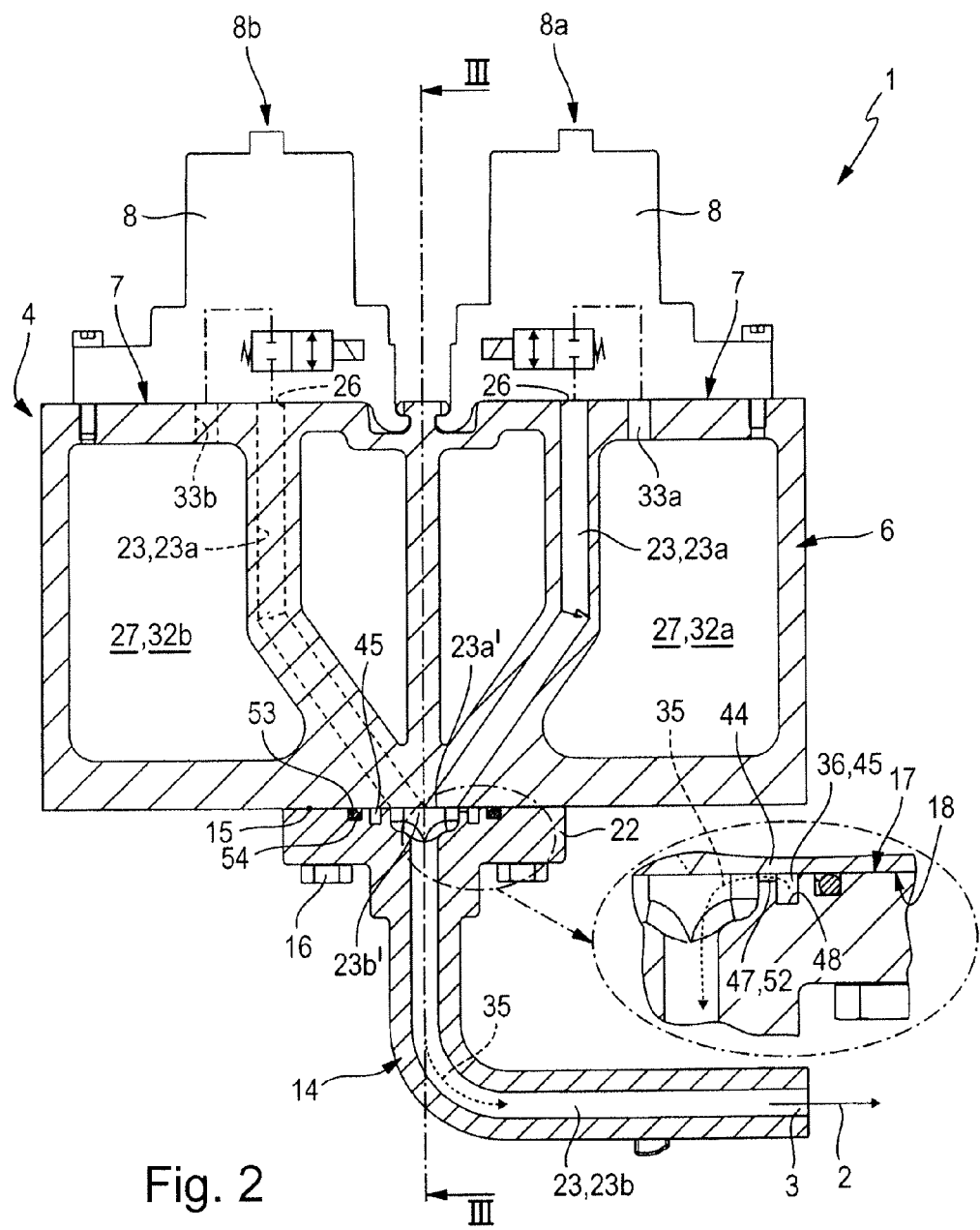
FIG. 2 is a cross-section through the sorting device from FIG. 1 along line II-II from FIG. 1, the sorting valves only being indicated diagrammatically.

The sorting device generally identified by the reference number 1 is designed to emit air blasts 2 indicated by arrows selectively at any of a plurality of sorting nozzles 3. The air blasts 2 are pulsed air flows which are directed onto a flow of individual items which pass the sorting nozzles 3 in the operation of the sorting device 1, in order to eliminate selected items from the flow, while taking account of certain sorting criteria. This in particular facilitates a distinction between acceptable and reject parts, for example in the food industry, but also in any number of other branches.

The sorting device 1 comprises at least one sorting unit 4 with a plurality of sorting nozzles 3, which are expediently arranged in a linear row to form a nozzle row, the longitudinal direction of which is indicated at 5 by a dot-dash line. All sorting nozzles 3 expediently lie in a common plane, each being represented by the exit port of an individual sorting passage 23, through which the compressed air providing the air blast is passed.

The sorting device 1 can comprise a plurality of sorting units 4 distributed in any arrangement.

The sorting unit 4 comprises a valve support 6, which is preferably block- or plate-shaped. On at least one outer mounting surface 7 of the valve support 6, a plurality of electrically actuated 2/2-way valves is installed; in view of their application, these will hereinafter be referred to as sorting valves 8. In the illustrated embodiment, the sorting valves 8 are arranged adjacent to one another on the mounting surface 7 in two parallel first and second valve banks 8a, 8b with mutually parallel line-up directions 12a, 12b. Each valve bank 8a, 8b contains a plurality of sorting valves 8 arranged consecutively in the respective line-up direction 12a, 12b. The sorting valves 8 are individually actuated electrically, being provided with electromechanical connecting means for feeding in the required electric actuating signals.

In contrast to this embodiment, the sorting unit may be equipped with a different number of banks of sorting valves 8, in particular with only one such valve bank. The dual arrangement of valve banks 8a, 8b, however, facilitates a particularly compact construction of the sorting unit 4. This in particular applies to an arrangement in which the sorting valves 8 of the first valve bank 8a are offset by half a valve width in the line-up directions 12a, 12b relative to the sorting valves 8 of the second valve bank 8b; this will be explained at a later point.

The sorting valves 8 are secured to the valve support 6 by screwed connections 14a in particular, although other methods are possible in principle, as is a complete integration of the sorting valves 8 into the valve support 6.

On the valve support 6, there is provided at least one and preferably precisely one nozzle body 4, which comprises a plurality of sorting nozzles 3 and which defines all sorting nozzles 3 of the sorting unit 4. The number of sorting nozzles 3 expediently corresponds to the number of sorting valves 8 mounted on the valve support 6.

Although it would in principle be possible to integrate the valve support 6 with the nozzle body 15 into a single piece, it is, for reasons to be explained later, deemed advantageous if the nozzle body 14, as in the illustrated embodiment, is a body which is separate from the valve support 6 and mounted on an outer surface of the valve support 6 in a joint region 15. For this purpose, the illustrated embodiment provides a screw connection involving a plurality of mounting screws 16 passing through the nozzle body 14 while being supported with their screw heads on the nozzle body 14 and tightened into threaded holes of the valve support 6. In this process, the nozzle body 14 is clamped to the valve support 6 in the joint region 15.

A preferably releasable connection between the nozzle body 14 and the valve support 6 provides the advantageous possibility of equipping one and the same valve support 6 alternatively with nozzle bodies 14 of different designs.

The nozzle body 14 has a nozzle body joint surface 17 for attaching to a valve support joint surface 18 of the valve support 6 in the joint region 15. The nozzle body joint surface 17 expediently is a part of a plate-shaped flange section 22 of the nozzle body 14, through which the mounting screws 16 pass as well.

The mounting surface 7 is divided into a number of mounting locations matching the number of sorting valves 8, on each of which one of the sorting valves 8 is located. From each of these mounting locations, a sorting passage 23 emerges, passing both through the valve support 6 and through the nozzle body 14. In accordance with this, each sorting passage 23 has a longitudinal inner subsection 23a extending in the valve support 6 and a longitudinal outer subsection 23b extending in the nozzle body 14. The longitudinal inner subsection 23a extends between the mounting surface 7 and the valve support joint surface 18. The longitudinal outer subsection 23b extends between the valve support joint surface 18 and an outer passage opening defining the sorting nozzle 3. The longitudinal routing of the longitudinal outer subsection 23b is chosen such that the sorting nozzles 3 are oriented in the direction desired for the application of the sorting device 1. In the illustrated embodiment, they have an approximately L-shaped longitudinal routing for this purpose.

In the joint region 15, first passage orifices 23a' of the longitudinal inner subsections 23a and second passage orifices 23b' of the longitudinal outer subsections 23b are arranged opposite one another in pairs, resulting in a continuous fluid connection between the longitudinal inner subsection 23a and the longitudinal outer subsection 23b of each sorting passage 23.

The first and second passage orifices 23a', 23b', which communicate with one another in pairs, are expediently lined up in at least one and preferably in precisely one row of orifices 24, the row of orifices 24 preferably having a linear dimension, the line-up direction of which is indicated at 25 by a dot-dash line. The row of orifices 24 expediently extends parallel to each valve bank 8a, 8b.

The longitudinal inner subsections 23a of the sorting passages 23 terminate towards the mounting surface 7 with a feed-in port 26 each. Via these feed-in ports 26, each of the sorting passages 23 communicates with one of the sorting valves 8. In the illustrated embodiment, these feed-in ports 26 are arranged in two parallel rows of ports, each of which is assigned to one of the two valve banks 8a, 8b. In accordance with the axial offset of the two valve banks 8a, 8b, the feed-in ports 26 assigned to the first valve bank 8a are likewise offset relative to the feed-in ports 26 assigned to the second valve bank 8b. As a result, the longitudinal inner subsections 23a of the sorting passages 23 are also offset relative to one another in the line-up direction 12a, 12b of the valve banks 8a, 8b. As the passage diameters of the longitudinal inner subsections 23a are smaller than the width of the sorting valves 8 as measured in the line-up direction 12a, 12b, there is the advantageous possibility of choosing the offset of the sorting passages 23 in the line-up direction 12a, 12b such that, in the row of orifices 24, first and second passage orifices 23a', 23b' belonging to sorting passages 23 of different valve banks 8a, 8b are alternately arranged consecutively. In this way, the sorting nozzles 3 arranged consecutively in the longitudinal direction 5 can alternately be connected to sorting valves 8 of one and the other valve bank 8a, 8b. In accordance with this, there is the advantageous possibility of assigning the sorting valves 8 divided into two adjacent valve banks 8a, 8b functionally to those sorting nozzles 3 which lie in one and the same row of nozzles. In the illustrated embodiment, the number of the sorting nozzles 3 contained in the row of nozzles is twice the number of sorting valves 8 contained in each valve bank 8a, 8b.

In contrast to this embodiment, it is obviously possible to provide only one bank of sorting valves 8 and to arrange all feed-in ports 26 on the mounting surface 7 in a row.

The valve support joint surface 18 is expediently located on an outer surface of the valve support 6 opposite the mounting surface 7, but is can be placed on another side of the valve support 6 if the longitudinal inner subsection 23a is routed accordingly.

The sorting unit 4 comprises a common feed passage 27, from which all sorting valves 8 are supplied with the compressed air used for generating the air blasts. This common feed passage 27 is formed in the valve support 6 in particular. On the outside of the valve support 6, there is a compressed air feed-in port 28 of the common feed passage 27; in the operation of the sorting device 1, this is connected to an external compressed air source not shown in detail. The common feed passage 27 expediently divides in the interior of the valve support 6 into two parallel compressed air distribution passages 32a, 32b, which extend parallel to one another and each of which is assigned to one of the valve banks 8a, 8b. From each compressed air distribution passage 32a, 32b, one feed branch passage 33a, 33b per sorting valve 8 branches off to terminate at the mounting surface 7 in the region of one of the mounting locations provided there, so that it is fluidically connected to the sorting valve 8 mounted at the respective mounting location. The feed branch passages 33a of one compressed air distribution passage 32a lead to the sorting valves 8 of the first valve bank 8a, while the feed branch passages 33b of the second compressed air distribution passage 32b lead to the sorting valves 8 of the second valve bank 8b.

In contrast to the illustrated embodiment, the common feed passage 27 may only have a single compressed air distribution passage in the valve support 6 to communicate via a suitable number of feed branch passages with all sorting valves 8 mounted on the valve support 6. This in particular applies to a design in which the valve support 6 is equipped with only one bank of sorting valves 8.

In any case, the common feed passage 27 offers the advantageous possibility of supplying all sorting valves 8 of the sorting unit 4 together with compressed air for the generation of the air blasts 2.

Each of the sorting valves 8 can optionally be switched into an open position or a closed position by means of suitable electric actuation. While each sorting valve 8 establishes or enables a fluid connection between the associated sorting passage 23 and the common feed passage 27 in the open position, this fluid connection is blocked in the closed position of the sorting valve 8. This corresponds to a 2/2-way functionality as is typical for a shutoff valve in particular.

The sorting valves 8 are in particular designed such that they block completely in the closed position and do not allow any fluid transfer from the common feed passage 27 into the associated sorting passage 23.

In the non-actuated basic position, the sorting valves 8 adopt the closed position. In order to generate an air blast 2, they are actuated for a short time only and switched into the open position. This being so, they are designed as fast-acting valves which can switch from the closed position to the open position and back to the closed position within a few milliseconds.

At the times when a sorting valve 8 adopts its closed position, there is normally a risk that impurities could enter through the sorting nozzle 3 into the particular sorting passage 23, and these could block the sorting passage 23 or possibly migrate as far as the sorting valve 8 and cause malfunctions there. For this reason, the sorting device 1 is equipped with a purging device 34, by means of which a purge air flow indicated in the drawing at 35 by dotted arrows can be generated in the sorting passages 23, which purge air flow is directed towards the particular sorting nozzle 3. The purging device 34 comprises a purge air passage 36, which is common to a plurality of and preferably to all of the sorting passages 23 and which is fed from a purge air source 37 with compressed air acting as purge air, which can be fed from the common purge air passage 36 to each of the sorting passages 23 in a region remote from the associated sorting nozzle 3. A major advantage of the purging device 34 results from the fact that the respective sorting passages 23 are connected to the common purge air passage 36 independently of the sorting valves 8. The purge air flow 35 is therefore neither controlled by the sorting valves 8, nor does it pass through the sorting valves 8. The sorting valves 8 do not participate in the provision of the purge air flow 35. For this reason, the sorting valves 8 can be inexpensive in their design.

The flow rate of the purge air flow 34 within the sorting passages 23 is considerably lower than that of the compressed air flow generating an air blast 2. This being so, the air purging process requires little energy, even if—as in the preferred case—the purge air flow 35 is continuously present in all sorting passages 23, irrespective of whether the associated sorting valve 8 is in the closed position or the open position. Compressed air is discharged continuously from each sorting passage 23 at its sorting nozzle 3, this being either the purge air only in the closed position of the sorting valves 8, or the purge air together with the compressed air generating an air blast in the open position of the respective sorting valve 8. Irrespective of the reaction time of the sorting valves 8, this provides an effective protection against an ingress of impurities into the sorting passages 23 through the sorting nozzles 3.

The common purge air passage 36 with its fluidic parallel-connection to all sorting passages expediently terminates on the outside of the sorting unit with a purge air feed-in port 38. The purge air source 37 can be or is connected to this purge air feed-in port 38, in particular with the interposition of a suitable fluid line. It is further advantageous if the common purge air passage 36 is assigned a purge air presetting device 43 indicated diagrammatically in the drawing, which facilitates a variable presetting of the flow rate of the purge air flow 35. Such a purge air presetting device 43 is in particular represented by a pressure control valve 43a, as is the case in the illustrated embodiment. Alternatively or in addition, the purge air presetting device 43 may be capable of completely blocking the purge air flow and of disconnecting the purge air source 37 from the common purge air passage 36. In this way, the purge air flow 35 can be blocked, for example during prolonged stoppages of the sorting device 1.

The purge air presetting device 43 is expediently connected to the purge air feed-in port 38. It can be a component which is separate from the sorting unit 4. It is, however, also possible to design the purge air presetting device 43 as an integral part of the sorting unit 4.

The common purge air passage 36 communicates with each sorting passages 23 at a point which is hereinafter described as purge air entry region 44. This purge air entry region 44 is within each sorting passage 23 placed at a distance from both the sorting nozzle 3 and the associated sorting valve 8 or its feed-in port 26 respectively. This means that the purge air flow 35 does not pass through the whole sorting passage 23, but only through the longitudinal subsection between the purge air entry region 44 and the sorting nozzle 3. This is preferably the longitudinal outer subsection 23b of the sorting passage 23, as is the case in the illustrated embodiment. For this purpose, it is provided that the purge air entry regions 44 are in all sorting passages 23 located in the joint region 15 between the nozzle body 14 and the valve support 6. The purge air flows therefore exclusively or to a greater extent through the nozzle body 14 only, with only a little, if any, entering the valve support 6.

The common purge air passage 36 is expediently formed exclusively in the nozzle body 14. This being so, the purge air feed-in port 38 is expediently also located on the nozzle body 14 and may be a part of a connecting device for fitting a fluid line establishing the connection to the purge air presetting device 43 and to the purge air source 37.

It is considered particularly advantageous if a longitudinal section of the common purge air passage 36 is designed as an annular, continuous purge air distribution passage 45, which frames the row of orifices 24 in the joint region 15. This purge air distribution passage 45 communicates via a connecting passage 46 of the common purge air passage 36 with the purge air feed-in port 38 while being connected to each of the sorting passages 23 in the diverse purge air entry regions 44. All sorting passages 23 are therefore connected to the purge air distribution passage 45 in a fluidic parallel arrangement and are simultaneously fed with the purge air from the purge air distribution passage 45.

In order to provide comparably constant purge air flow rates at the existing sorting passages 23, the purge air distribution passages 45 are preferably designed as restriction points. Each restriction point is defined by a restrictor passage 47, one such restrictor passage 47 being individually assigned to each sorting passage 23. Each sorting passage 23 is therefore connected to the purge air distribution passage 45 via its own individual restrictor passage 47.

The restrictor passages 47 expediently define one and the same restriction intensity and ensure that uniform purge air flows are formed in the diverse sorting passages 23. The restrictor passages 47 furthermore limit the air throughput, thereby reducing the air consumption.

The illustrated embodiment shows an advantageous variant of the purge air distribution passage 45 and the restrictor passages 47 connected thereto. In this embodiment, a groove hereinafter described as distribution groove 48 is formed in the nozzle body 14 in the nozzle body joint surface 17, and this groove extends around the row of second passage orifices 23b' terminating towards the nozzle body joint surface 17 and can therefore be described as a self-contained annular groove. On its open long side lying in the nozzle body joint surface 17, this distribution groove 48 is covered by the opposite valve support joint surface 18, resulting in a peripherally closed passage which forms the purge air distribution passage 45.

The restrictor passages 47 are implemented in a comparable way. Each restrictor passage 47 consists of a groove formed in the nozzle body joint surface 17 and hereinafter described as restrictor groove 52, which extends between the distribution groove 48 and one each of the second passage orifices 23b' and which is likewise covered by the valve support joint surface 18 on its open long side facing the valve support 6. The cross-section of each restrictor groove 52 or each restrictor passage 47 is smaller than the cross-section of the distribution groove 48 or the purge air distribution passage 45.

In an embodiment not illustrated in the drawing, the purge air distribution passage 45 has a limited length, extending only along the long side of the row of orifices 24.

Figure 3:
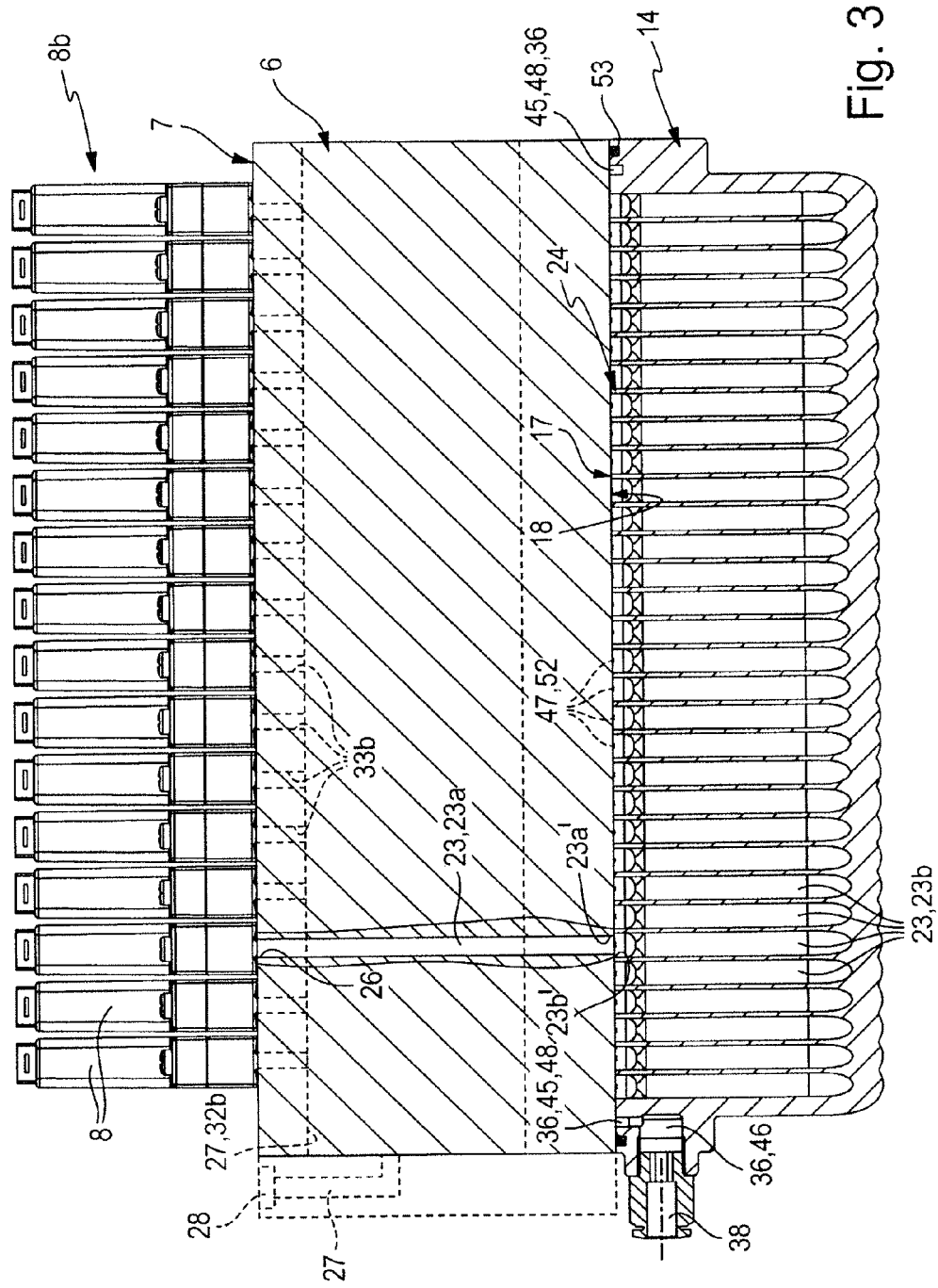
FIG. 3 is a longitudinal section through the sorting device from FIG. 1 along line III-III from FIGS. 1, 2 and 5.
Figure 4:
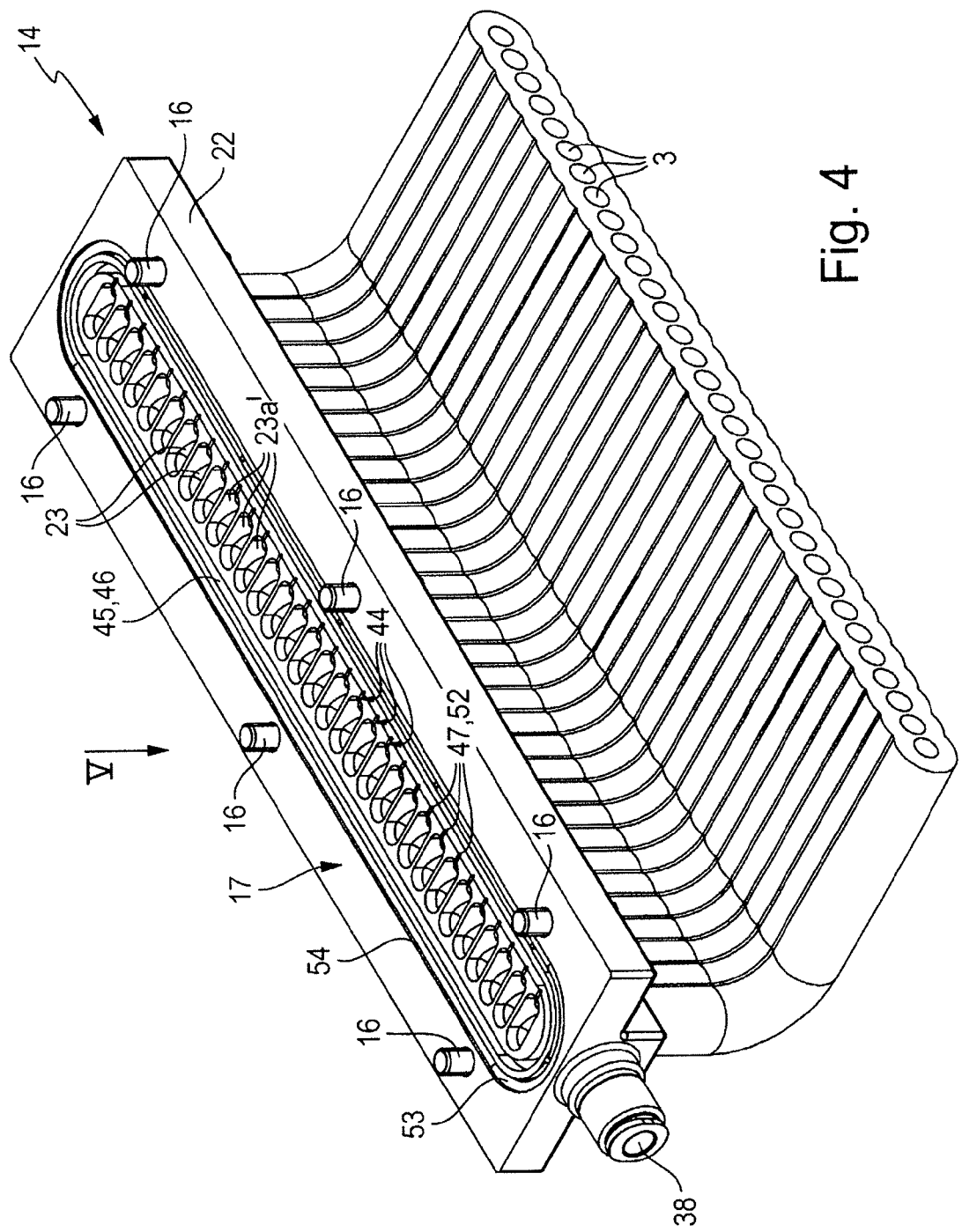
FIG. 4 shows an isometric detail of a nozzle body belonging to the sorting device and defining the sorting nozzles.

The connecting passage 46 expediently terminates on one of the two narrow sides of the distribution groove 48 into the bottom of the distribution groove 48. This can be seen most clearly in FIG. 3. On its two narrow sides, where its flanks the row of orifices 24, the distribution groove 48 is expediently semicircular. The longitudinal sections of the distribution groove 48, which extend on opposite sides along the row of orifices 24, expediently have a linear dimension.

The purge air feed-in port 38 is preferably situated at an end face of the nozzle body 14 which is oriented in the longitudinal direction of the row of orifices 24.

In contrast to the illustrated embodiment, it is also possible to form the distribution groove 48 and the restrictor grooves 52 in the valve support 6 with at least a part of their cross-section, the illustrated version offering the advantage that there is no need for structuring measures at the valve support joint surface 18.

To prevent any leakage of purge air in the joint region 15, a seal 53 which frames the purge air distribution passage 45 or the distribution groove 49 all round on the outside is expediently provided in the joint region 15. In the joint region 15, the seal 53 is pressed against the valve support 6 on the one hand and against the nozzle body 14 on the other hand while forming a seal.

In the nozzle body joint surface 17, a self-contained seal location groove 54 is expediently formed, which frames the distribution groove 48 and into which a seal 53 is installed, in particular placed as a separate annular sealing element.

In the region framed by the seal 53, where the purge air distribution passage 45 and the row of orifices 24 are located, there are expediently no sealing measures implemented by means of soft seals. Here, the hard surface contact between the nozzle body joint surface 17 and the valve body joint surface 18 is sufficient for the elimination of uncontrolled transverse flow between the sorting passages 23.

The invention claimed is:

1. A sorting device for sorting out parts by means of air blasts, the sorting device comprising at least one sorting unit, the at least one sorting unit comprising:
   a valve support having a common feed passage and a plurality of individual sorting passages;
   a plurality of electrically actuated sorting valves which have a 2/2-way functionality supported on the valve support, each of the plurality of electrically actuated sorting valves being supplied with compressed air from the common feed passage and each of the plurality of electrically actuated sorting valves being connected to one of the plurality of individual sorting passages;
   a plurality of sorting nozzles supported on the valve support, wherein each of the plurality of sorting valves can optionally be switched into an open position connecting an associated sorting passage to the common feed passage, thereby causing an air blast to emerge from the associated sorting nozzle, or into a closed position, wherein purge air discharged from the sorting nozzle at a lower flow rate than that of the air blast which can be generated in the open position can be fed into each sorting passage; and
   a common purge air passage for feeding the purge air to each of the plurality of sorting nozzles for cleaning purposes, wherein the common purge air passage is structurally separated from the common feed passage and is in fluid communication with all of the sorting passages in an area between the plurality of electrically actuated sorting valves and the plurality of sorting nozzles such that purge air is supplied independently of the sorting valves.

2. A sorting device according to claim 1, wherein the common purge air passage terminates into each individual sorting passage in a purge air entry region which is distant both from the associated sorting nozzle and from the associated sorting valve, such that the purge air flows only through a longitudinal outer subsection of the sorting passage which adjoins the sorting nozzle.

3. A sorting device according to claim 1, wherein the common feed passage terminates on the outside of the sorting unit with a purge air feed-in port, to which a purge air source is connectable or connected.

4. A sorting device according to claim 1, wherein a purge air presetting device for the variable presetting of the flow rate of the purge air flow is assigned to the common purge air passage.

5. A sorting device according to claim 4, wherein the purge air presetting device is a pressure control valve.

6. A sorting device according to claim 4, wherein the common feed passage terminates on the outside of the sorting unit with a purge air feed-in port, to which a purge air source is connectable or connected, the purge air presetting device being connectable or connected to the purge air feed-in port.

7. A sorting device according to claim 1, wherein the common purge air passage is connected to each sorting passage with the interposition of at least one individual restrictor passage, respectively.

8. A sorting device according to claim 7, wherein the individual restrictor passages are represented by longitudinally covered restrictor grooves, which are formed in a body of the sorting unit and covered by another body of the sorting unit.

9. A sorting device according to claim 1, wherein the sorting unit comprises a nozzle body, which is fitted to the valve support in a joint region, and in which the sorting nozzles are formed, wherein each sorting passage comprises a longitudinal outer subsection extending in the nozzle body and a longitudinal inner subsection extending in the valve support towards the associated sorting valve, wherein the longitudinal outer subsection of each sorting passage merges into the associated longitudinal inner subsection in the joint region and wherein the sorting passages are fluidically parallel-connected to the common purge air passage in the joint region.

10. A sorting device according to claim 9, wherein the common purge air passage is exclusively formed in the nozzle body.

11. A sorting device according to claim 9, wherein the valve support has in the joint region a valve support joint surface, to which the nozzle body is attached by a nozzle body joint surface, wherein the longitudinal outer subsections of the sorting passages terminate at the nozzle body joint surface with passage orifices opposite the sorting nozzles and communicate with passage orifices of the longitudinal inner subsections of the sorting passages, which passage orifices are formed on the opposite side on the valve support joint surface, resulting in at least one row of orifices consisting of oppositely paired passage orifices of the longitudinal outer subsections and the longitudinal inner subsections of the sorting passages.

12. A sorting device according to claim 11, wherein the at least one row of orifices has a linear extension.

13. A sorting device according to claim 11, wherein a purge air distribution passage of the common purge air passage, which is represented by a distribution groove which is formed in one or both of the nozzle body joint surface and the valve support joint surface and covered by the opposite joint surface, and which extends along the row of orifices, is located in the joint region, communicating in a fluidic parallel-connection with all sorting passages assigned to the row of orifices.

14. A sorting device according to claim 13, wherein the purge air distribution passage has a self-contained longitudinal extension and is framing the row of orifices in the joint region.

15. A sorting device according to claim 14, wherein a purge air feed-in port, which communicates with the joint purge air passage and is connected to the distribution groove forming part of the purge air distribution passage via a connecting passage formed in the nozzle body, is located on the outside of the nozzle body.

16. A sorting device according to claim 13, wherein the purge air distribution passage is connected to each sorting passage in the joint region with the interposition of at least one individual restrictor passage each, the individual restrictor passages being represented by restrictor grooves formed in one or both of the nozzle body joint surface and the valve support joint surface and covered by the opposite joint surface.

17. A sorting device according to claim 1, wherein two parallel valve banks of sorting valves, which are connected to sorting nozzles arranged in a single row only by means of associated sorting passages, are located on the valve support, the sorting nozzles arranged consecutively in the row of nozzles being alternately connected to the sorting valves of the one and the other valve bank.

* * * * *